United States Patent [19]

Burnham et al.

[11] 4,200,539
[45] Apr. 29, 1980

[54] FRACTURING COMPOSITIONS AND METHOD OF PREPARING AND USING THE SAME

[75] Inventors: John W. Burnham, Duncan, Okla.; Robert L. Tiner, Brownfield, Tex.

[73] Assignee: Halliburton Company, Duncan, Okla.

[21] Appl. No.: 898,055

[22] Filed: Apr. 20, 1978

[51] Int. Cl.$^2$ ............................................. E21B 43/26
[52] U.S. Cl. ................................. 252/8.55 R; 137/13; 166/308; 252/316
[58] Field of Search ............. 252/8.55 R, 8.5 M, 32.5; 166/283, 308

[56] References Cited

U.S. PATENT DOCUMENTS

| | | | |
|---|---|---|---|
| 2,228,659 | 1/1941 | Farrington et al. | 252/32.5 |
| 2,325,597 | 8/1943 | Farrington et al. | 252/32.5 |
| 3,757,864 | 9/1973 | Crawford et al. | 166/308 |
| 4,031,014 | 6/1977 | Griffin | 252/8.55 |

*Primary Examiner*—Herbert B. Guynn
*Attorney, Agent, or Firm*—Thomas R. Weaver; John H. Tregoning; William R. Laney

[57] ABSTRACT

Compositions useful in the fracturing of subterranean formations are prepared by incorporating aluminum salts of one or more aromatic phosphoric acid esters in an oil base fluid. The salts can be formed separately followed by addition of the salt to the oil, or the salt can be formed in situ by separately adding to the oil an aromatic phosphoric acid ester and an aluminum compound which reacts with the ester to form the salt. In fracturing a subterranean formation, the fracturing composition is introduced into an oil or gas well, and from the well bore into the formation to form and propagate a fracture in the formation.

5 Claims, No Drawings

FRACTURING COMPOSITIONS AND METHOD OF PREPARING AND USING THE SAME

This invention relates to fracturing compositions useful in oil and gas production, and to methods for preparing such compositions. The invention further relates to methods for preparing certain aluminum salts which, when incorporated in an oil base liquid, function to increase the viscosity of the liquid and also to reduce the frictional resistance to flow exhibited by the base liquid.

Throughout this disclosure the word "phosphate" is used interchangeably with orthophosphate and monophosphate. Accordingly, any reference to orthophosphate means phosphate and also means monophosphate. Any reference to phosphate means orthophosphate and also monophosphate, and any reference to monophosphate means phosphate and also orthophosphate.

In the fracturing of a subterranean formation for the purpose of enhancing the production of oil and/or gas therefrom, hydraulic pressure imparted by a fracturing fluid is utilized to produce, enlarge and propagate a fracture at a selected location in the formation. The sophistication of such fracturing procedures has attained a high level, and extends, in one facet, to the custom preparation and blending of the fracturing fluid utilized in order to optimize its fracturing properties. Fracturing compositions are pumpable liquids which include oil base liquids having various additives incorporated therein to improve or achieve certain desirable results when the composition is forced into the formation under high pressure.

It is highly desirable that a fracturing composition exhibit low frictional resistance to the flow of the composition in the well bore conduit during fracturing. A number of compounds and mixtures of compounds have previously been proposed, and in some cases used, as friction-reducing additives to oil base fluids to enhance their flow properties when used in fracturing. Among these are the aluminum salts of aliphatic phosphates described in Crawford et al. U.S. Pat. No. 3,757,864. These compounds are described as being useful to reduce the frictional resistance to flow of an oil base liquid and further, when added in sufficient amounts, as being useful to increase the gel strength of such fracturing compositions.

The present invention relates to fracturing compositions having relatively high viscosity and relatively low frictional resistance to flow, and to methods of preparing and using such compositions. The fracturing composition can be broadly described as consisting essentially of a pumpable oil base liquid and an aluminum salt present in the composition in an amount in the range of from about 0.25 to about 6.0 percent by weight of the composition, wherein the aluminum salt is an aluminum aromatic phosphate compound selected from the group consisting of aluminum aryl phosphates, aluminum aliphatic-aryl phosphates, aluminum aryl aliphatic phosphates, aluminum aliphatic-aryl aliphatic phosphates, aluminum aryl aliphatic-aryl phosphates, and mixtures thereof. The term aliphatic is used here to mean saturated, olefinic and/or acetylenic straight and/or branched chain substituents. The term aryl is defined as a phenyl group, and the term aliphatic-aryl is defined as including phenyl groups substituted by an aliphatic substituent as this term is defined. These aluminum salts can be generically represented by the structural formula:

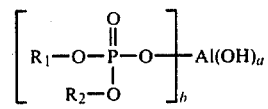

where
a = 0 to 2,
b = 1 to 3,
and the sum of a + b = 3;
$R_1$ = an aryl or aliphatic hydrocarbon-aryl group containing from 6 to 26 carbon atoms, and
$R_2$ = an aryl, aliphatic hydrocarbon-aryl or aliphatic hydrocarbon group containing from 1 to 26 carbon atoms, or H;

provided, however, that where $R_1$ is an aryl group, then $R_2$ must be either an aliphatic group containing at least 6 carbon atoms, or an aliphatic-aryl group containing at least 12 carbon atoms; and provided that if $R_2$ is an aryl group, then $R_1$ is an aliphatic-aryl group containing at least 12 carbon atoms; and provided that if both $R_1$ and $R_2$ are aliphatic-aryl groups, one of $R_1$ or $R_2$ contains at least 12 carbon atoms; and provided that where $R_1$ is an aliphatic-aryl containing less than 12 carbon atoms and $R_2$ is aliphatic, $R_2$ must contain at least 6 carbon atoms.

The fracturing compositions can further contain certain conventional additives, including especially a propping agent, such as glass beads, walnut shells, sand or other hard particulate proppants known to the art.

In the preparation of the fracturing compositions of the invention, the aluminum salts can be initially prepared and then blended with the oil base liquid in the weight percentage range previously described. In preparing the salt, a phosphate is first prepared by reacting a phenolic compound or aliphatic-aryl compound with phosphorus pentoxide, phosphorus oxychloride or a phos-, phorus halide. If an aryl aliphatic phosphate is to be prepared, the phosphorus compound can be reacted with an aliphatic alcohol after it has been partially reacted with the aromatic compound. After the phosphate is prepared, the aluminum salt is formed by reacting the phosphate with an aluminum compound selected from an alkali metal aluminate, aluminum isopropoxide, aluminum hydroxide or the like.

The aluminum salt can alternatively be prepared in situ. The phosphate is initially added to the oil base, followed by addition of one or more of the above-mentioned aluminum compounds.

In using the fracturing composition, the viscous fracturing fluid containing the aluminum salt can then be further modified by the addition of propping agents and then introduced into the formation at a selected point under sufficient pressure to form a fracture.

As will be apparent from this broad description, the fracturing compositions of this invention are relatively simple in constitution, and can be easily formulated. Moreover, the compositions, as thus prepared, exhibit good flow properties, having reduced frictional resistance in turbulent flow. The compositions are also characterized in having relatively high viscosity which facilitates the suspension and transport of large particulate materials, of the type used as propping agents, through the conduit and into the formed fracture.

Having broadly alluded to the compositions of the invention and their methods of preparation and usage, and having cited certain salient characteristics and advantages of the fracturing compositions, the subsequent description herein will be directed to a consideration of certain preferred embodiments of the invention, and to a detailed description of these embodiments in conjunction with examples set forth as illustrative of typical practice of the invention utilizing certain preferred embodiments.

As has been previously stated, the active or effective additive component of the fracturing composition is a compound or mixture of compounds which are generically described as aluminum aromatic phosphates in which the aromatic phosphate constituting a precursor of the salts includes an aryl or aliphatic-aryl substituent containing from about 6 to about 26 carbon atoms. In the currently preferred additive compounds, the salt is an aluminum aromatic aliphatic phosphate in which the aliphatic substituent contains from 1 to about 20 carbon atoms. The most preferred salts are the aluminum aromatic aliphatic phosphates wherein the aliphatic substituent contains from 6 to 18 carbon atoms.

A large number of aromatic compounds (and more specifically, phenolic compounds) can be reacted with phosphorus pentoxide, phosphorus oxychloride or a phosphorus halide compound to prepare the ester later reacted with the aluminum compound to produce the salt additive, but certain species are preferred. Such preferred aromatic compounds include phenol, m-cresol, o-cresol and the xylenols. Other less preferred aromatic compounds which can be utilized include 2-propylphenol, 4-decylphenol, 4-propylphenol, 3-butylphenol, 3-tetradecylphenol; 2-propyl, 4-methylphenol; 3-octylphenol and 4-isopropylphenol. In forming the phosphates, mixtures of the described aromatic compounds can be utilized and reacted with the phosphorus compound employed to form a mixture of esters, which can then be reacted with sodium aluminate, or other appropriate aluminum compound as hereinafter described, to form a mixture of the salts utilized in the fracturing composition.

Where the preferred aryl aliphatic phosphates are to be prepared as precursors of the salts used in the fracturing composition, the phenolic compound is first reacted with the phosphorus pentoxide, or other appropriate phosphorus compound, followed by a further substitution of the ester with an aliphatic group. This is accomplished by reaction of the initially formed aryl pyrophosphate with an amount of a selected aliphatic alcohol or mixture of such alcohols. It should be pointed out that in actual practice, the preparation described yields a mixture of aryl phosphate, aryl aliphatic phosphate and aliphatic phosphates. The aliphatic alcohols which are preferably employed are those which contain from 6 to 18 carbon atoms and are normal alcohols or mixtures of normal alcohols having a chain length in this range. Less preferably, however, alcohols containing from 1 to 5 or 19 and 20 carbon atoms can be employed. Also, as pointed out previously, the alcohols used can contain olefinic or acetylenic unsaturation, and can be branched as well as straight chain.

In the preferred preparation of the aryl aliphatic phosphates, the phenolic compound is liquefied, if necessary, and phosphorus pentoxide is then added to the aromatic compound slowly, and preferably under a blanket of nitrogen. Following the reaction of the phosphorus compound with the aromatic compound, the aliphatic alcohol is added slowly to the reaction mixture, and the mixture is heated for an extended period of time to form the aryl aliphatic phosphate.

Instead of employing the preferred phosphorus pentoxide in the formation of the phosphates, other phosphorus compounds, including phosphorus oxychloride and phosphorus halides, can be used in the preparation.

After preparation of the described esters of phosphoric acid, the aluminum salts of these esters are prepared by reaction of the esters with an aluminum compound. The aluminum compounds employed can be sodium (or other alkali metal) aluminate, aluminum isopropoxide or aluminum hydroxide. Preferably the aluminum salts are prepared by adding to the phosphate an aqueous solution of sodium hydroxide and sodium aluminate.

In the formation of the aluminum salts using the preferred sodium aluminate, the aromatic phosphate and sodium aluminate are combined in a weight ratio of from about 7:1 to about 14:1 with about 10 parts of the aromatic phosphate to 1 part of the sodium aluminate being preferred. Although the addition of the aqueous sodium hydroxide to the sodium aluminate prior to reacting the aluminate with the ester is not essential, it is preferred to add to the sodium aluminate from about 0.11 to about 0.22 weight percent (based on the final weight of the fracturing composition) of sodium hydroxide, and from about 0.05 to about 0.1 weight percent water.

Examples of aromatic phosphates useful in forming the aluminum salts employed in the fracturing compositions of the invention are phenyl octyl phosphate, 4-dodecylphenyl ethyl phosphate, tolyl decyl phosphate, 2-butylphenyl phosphate, 2-propyl, 4-methylphenyl butyl phosphate, phenyl 2-butyl phosphate, 4-decylphenyl methylbutyl phosphate; 2,4,6-triethylphenyl heptyl phosphate and 3-tetradec-2-enyl phenyl phosphate.

A partial listing of aluminum phosphate salts constituting additives of the invention includes aluminum phenyl octyl phosphate, aluminum bis (4-dodecylphenyl) phosphate, aluminum 3-pentadec-2-enylphenyl 3-methylheptyl phosphate, aluminum 4-dodecylphenyl ethyl phosphate, aluminum tolyl decyl phosphate, aluminum phenyl 2-butenyl phosphate, aluminum 3-octadecylphenyl phosphate, and aluminum 2-isopropylphenyl tetradecyl phosphate.

A number of oil base liquids can be utilized as the principal component of the fracturing composition, and these liquids are generally well known in the art. Typically, liquid hydrocarbons constituting medium-density petroleum fractions, such as kerosene, a gas oil or diesel oil, can be suitably used. Various other aliphatic and aromatic hydrocarbons can also be used, including heptane, octane, nonane, decane, benzene, toluene, gasoline, ethyl benzene, fuel oils and crude oils.

The amount of the aluminum phosphate salt which is added to the oil base liquid is from about 0.25 to about 6.0 percent by weight of the composition. Preferably, at least 0.5 weight percent is added, and the most preferred composition contains from about 1.0 to about 4.0 percent by weight of the composition. As previously indicated herein, the salt can be pre-prepared and then added to the oil base liquid, or it can be formed in situ. The latter procedure constitutes the preferred method of incorporation of the salt in the oil base liquid, since better control of the properties of the fracturing composition is thereby achieved.

Where in situ formation of the salt is the procedure followed, the phosphate is initially added to the oil base liquid in amounts of from about 0.23 to about 5.3 percent by weight of the total composition. The aluminum compound, such as sodium aluminate, is then added in an amount of from about 0.025 to about 0.5 percent by weight of the composition. At the time of addition of the aluminum compound to the oil, it is beneficial to also add 0.01 to about 0.22 weight percent of sodium hydroxide, with the amount of this base added being preferably about 0.02 weight percent of the composition. It is also preferable to add at least 0.06 weight percent water to the composition.

The following examples illustrate the laboratory preparation of the phosphates constituting the aluminum salt precursors hereinbefore described, and also are illustrative of the preparation of the aluminum salts and final preparation of the fracturing compositions utilized.

EXAMPLE 1

Into a 3-neck, 250 ml., round bottom resin flask equipped with a mechanical stirrer, a reflux condenser, a solids inlet, an ice bath, a heating mantle and a nitrogen inlet are placed 60 g. (0.3 mole) of a mixture of alkanols containing from 12 to 14 carbon atoms, and sold under the tradename "ALFOL 1214," along with 18.8 g. (0.2 mole) of phenol. The flask is slightly heated with hot water to melt the phenol. 14.2 g. (0.1 mole) of $P_2O_5$ are then added to the alcohol-phenol mixture over a period of thirty minutes with the flask immersed in an ice bath. The ice bath is removed after the addition of the $P_2O_5$ is complete, and the reaction mixture is stirred for a period of thirty minutes at ambient temperature (about 24° C.). The flask is then heated to 80° C. and held there for one hour.

The reaction product, consisting of a mixture of aryl aliphatic phosphates, in which the aliphatic substituents of the phosphate compounds in the mixture vary from 12 to 14 in carbon chain length, and further containing smaller amounts of phenyl phosphate and aliphatic phosphates, is subjected to viscosity tests as hereinafter described in Example 5, and the results of such viscosity measurements are hereinafter set forth in Table I.

Using the phosphoric acid esters prepared as described in this Example, the aluminum salt of the ester mixture is then prepared as described in Example 3.

EXAMPLE 2

14.1 g. (0.15 mole) of phenol are placed in a flask of the type described in Example 1. The phenol is melted using a hot water bath, and then 14.2 g. (0.1 mole) of $P_2O_5$ are added over a period of 10 minutes under a blanket of nitrogen. The resulting temperature is 60° C. After the addition is complete, 19.5 g. (0.15 mole) of octanol are added drop-wise to the flask over a period of 30 minutes. Following this addition of octanol to the flask, the flask is heated to 120° C. and retained at this temperature for two hours. After cooling, the phosphoric acid ester is used to prepare the aluminum salt additive described in Example 4.

EXAMPLE 3

25 g. of sodium aluminate ($NaAlO_2$) and 11 g. of sodium hydroxide are added to, and dissolved in, 64 g. of deionized water. 2.5 ml (2.0 g.) of the mixture of aryl aliphatic phosphates prepared in Example 1 are added to 250 ml (200 g.) of kerosene. The kerosene solution is agitated while 0.75 ml (0.8 g.) of the aqueous solution containing sodium aluminate and sodium hydroxide is added to it. As the aluminum salt begins to form, a change in the viscosity of the reaction mixture is immediately noted.

EXAMPLE 4

Employing a second technique for the preparation of the aluminum salt of the phosphates, 25 g. of $AlCl_3.6H_2O$ are mixed with 50 ml of water. To the aqueous solution are added 22 ml of 50% sodium hydroxide with concurrent stirring. 2.5 ml of the aryl aliphatic phosphate composition prepared in Example 2 and 3 ml of the aqueous aluminum solution described are then mixed with 250 ml of kerosene to prepare the aluminum salts of the ester.

EXAMPLE 5

The viscosities of fracturing composition gels prepared using the aluminum salts of several aryl aliphatic phosphoric acid esters are measured, and the results of such measurements are presented in Table I. The procedure of preparation of the phosphoric acid esters is that described in Example 2, using equal molar amounts of the alcohol and phenolic compounds identified in Table I. The aluminum salts are prepared using the method described in Example 3. All of the fracturing compositions are prepared by in situ preparation of salts in kerosene at 80° F., and each of the fracturing fluid compositions, as thus prepared, contain 1.43 weight percent of the aluminum aryl aliphatic phosphate salt, or mixture of salts. All viscosities are measured using a Brookfield Viscometer, Model LVF, with a No. 4 spindle at 6 rpm. The constitution of the ALFOL commercially available mixtures of alkanols is defined in the footnotes to Table I.

TABLE I

| Aryl Compound | Aliphatic Alcohol | Viscosity (cp) |
| --- | --- | --- |
| Phenol | Octanol | 4500 |
| Phenol | ALFOL 610[a] | 7500 |
| Phenol | Dodecanol | 2000 |
| Phenol | ALFOL 1214[b] | 2000 |
| Phenol | ALFOL 1216[c] | 7500 |
| m-Cresol | Octanol | 2000 |
| m-Cresol | ALFOL 610 | 500 |
| m-Cresol | Dodecanol | 2000 |
| m-Cresol | ALFOL 1214 | 1000 |

[a] ALFOL 610 consists of 18 weight percent hexanol, 36 weight percent octanol and 46 weight percent decanol.
[b] ALFOL 1214 consists of 55 weight percent dodecanol and 45 weight percent tetradecanol.
[c] ALFOL 1216 consists of 65 weight percent dodecanol, 25 weight percent tetradecanol and 10 weight percent hexadecanol.

EXAMPLE 6

Ten gallons of a mixture of phosphoric acid esters derived from the reaction of phosphorus pentoxide with phenol and ALFOL 610, as hereinbefore defined, are added to 1000 gallons of kerosene at a temperature of 70° to 75° F. Subsequently, 2.5 gallons of an aqueous solution of sodium aluminate and sodium hydroxide, prepared in the manner hereinbefore described, are added to the kerosene. The resulting fracturing fluid gel is aged for a period of 24 hours, and its viscosity is then measured on a Model LVF Brookfield Viscometer with a No. 3 spindle at 6 rpm. The measured viscosity is in excess of 20,000 centipoises.

Tests of the fracturing compositions containing aluminum phosphate salts prepared in accordance with the invention showed them to be equivalent to commercially available fracturing compostions in frictional resistance to fluid flow.

In using the fracturing compositions prepared in accordance with the invention, they are injected under pressure into the formation from the well bore in general conformity with fracturing techniques well understood in the art. The compositions of the invention can be utilized for fracturing over substantially any practical pressure range, since the fracturing composition gels are not shear destructible. Fracturing is preferably carried out at a temperature of between 50° and 250° F. Injection can be accomplished at a flow rate, depending, of course, on the particular receptivity of the fracture being formed, at flow rates of from 80 to 6,400 gallons per minute. Preferably, at the time of commencing fracturing, or subsequently as the fracture is enlarged, one or more conventional proppants are added to the high viscosity composition and, by suspension therein, are carried into the fracture for propping purposes.

Although certain preferred embodiments of the invention have been herein described for illustrative purposes, it will be appreciated that various modifications and innovations in the procedures and compositions cited may be effected without departure from the basic principles which underlie the invention. Changes of this type are therefore deemed to lie within the spirit and scope of the invention except as the same may be necessarily limited by the appended claims or reasonable equivalents thereof.

What is claimed is:

1. The method of fracturing a subterranean formation which comprises:

admixing with an oil base fluid, from about 0.25 weight percent to about 6.0 weight percent of at least one compound selected from the group of aluminum salts consisting of aluminum phenyl phosphates, aluminum aliphatic-phenyl phosphates, aluminum phenyl aliphatic phosphates, aluminum aliphatic-phenyl aliphatic phosphates and aluminum phenyl aliphatic-phenyl phosphates, said salts having the structural formula

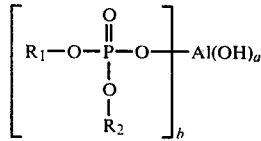

where $a = 0$ to 2,
$b = 1$ to 3,
and the sum of $a + b = 3$;
$R_1$ = a phenyl or aliphatic hydrocarbon-phenyl group containing from 6 to 26 carbon atoms, and
$R_2$ = a phenyl, aliphatic hydrocarbon-phenyl or aliphatic hydrocarbon group containing from 1 to 26 carbon atoms, or H;

provided, however, that where $R_1$ is a phenyl group, then $R_2$ must be either an aliphatic hydrocarbon group containing at least 6 carbon atoms, or an aliphatic hydrocarbon-phenyl group containing at least 12 carbon atoms; and provided that if $R_2$ is a phenyl group, then $R_1$ is an aliphatic hydrocarbon-phenyl group containing at least 12 carbon atoms; and provided that if both $R_1$ and $R_2$ are aliphatic hydrocarbon-phenyl groups, one of $R_1$ or $R_2$ contains at least 12 carbon atoms; and provided that where $R_1$ is an aliphatic hydrocarbon-phenyl containing less than 12 carbon atoms and $R_2$ is aliphatic hydrocarbon, $R_2$ must contain at least 6 carbon atoms; then pumping the mixture via a borehole into a formation adjacent the borehole at a formation fracturing pressure to fracture the formation.

2. The method defined in claim 1 wherein aluminum salts incorporated in the oil base fluid include an aluminum phosphate salt derived from a phosphate ester contributing an $R_1$ group containing from 6 to 8 carbon atoms, and further contributing an $R_2$ group containing from 6 to 16 carbon atoms in a saturated chain.

3. The method defined in claim 1 wherein said mixture is pumped into the formation at a flow rate of from about 80 to 6,400 gallons per minute.

4. The method defined in claim 1 and further characterized by the step of adding a propping agent to the mixture prior to pumping the mixture into the formation.

5. The method defined in claim 1 wherein said salt or salts are formed in situ by adding to the oil base fluid from about 0.23 weight percent to about 5.3 weight percent of at least one phosphate ester selected from the group consisting of phenyl phosphates, aliphatic-phenyl phosphates, phenyl aliphatic phsophates, aliphatic-phenyl aliphatic phosphates and phenyl aliphatic-phenyl phosphates then adding to the mixture of oil base fluid and ester, from about 0.025 to about 0.5 weight percent of an alkali metal aluminate.

* * * * *